Aug. 27, 1929.  D. H. CLUBB  1,726,384
CULTIVATOR
Filed Aug. 27, 1927   3 Sheets-Sheet 1
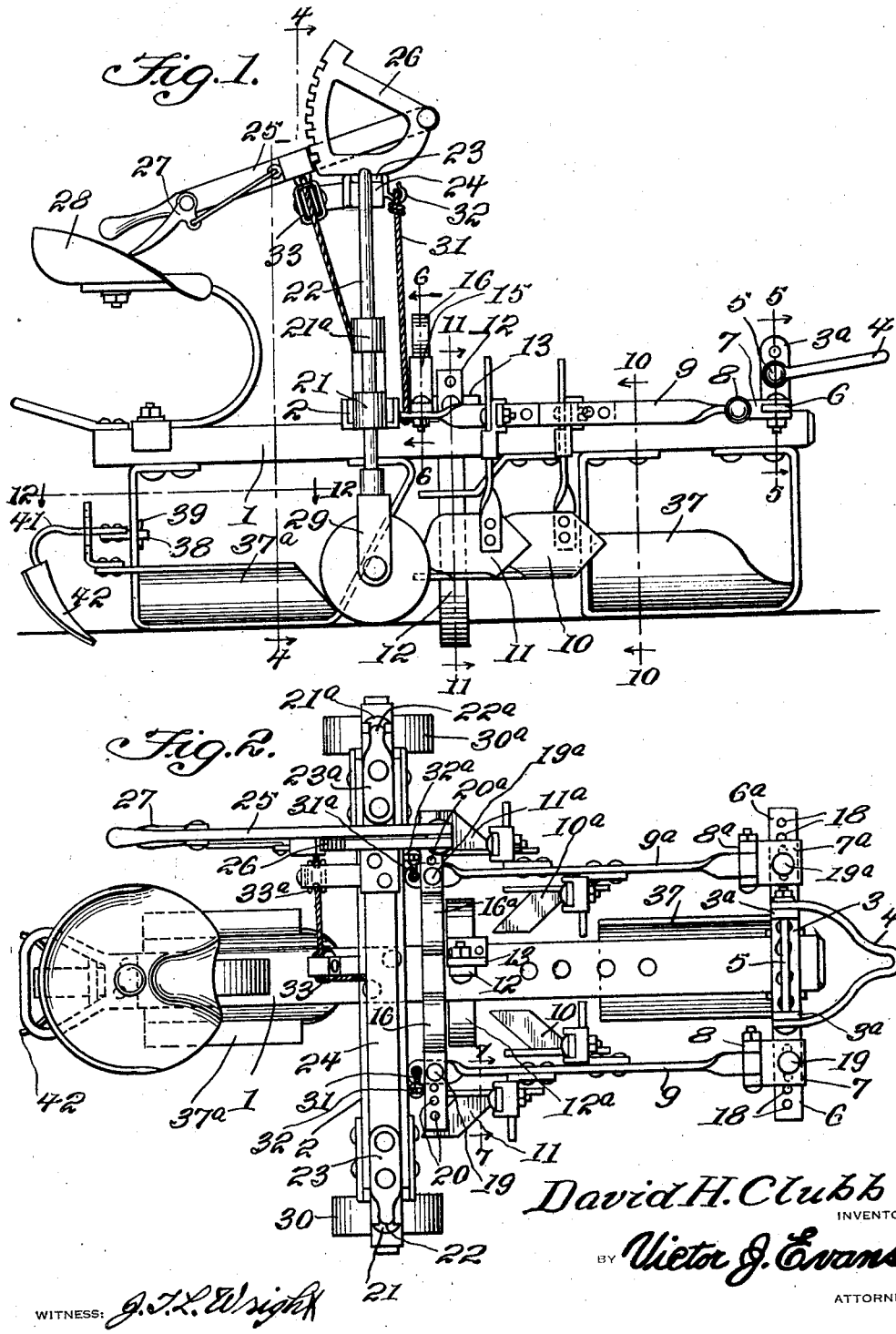
David H. Clubb
INVENTOR
BY Victor J. Evans
ATTORNEY

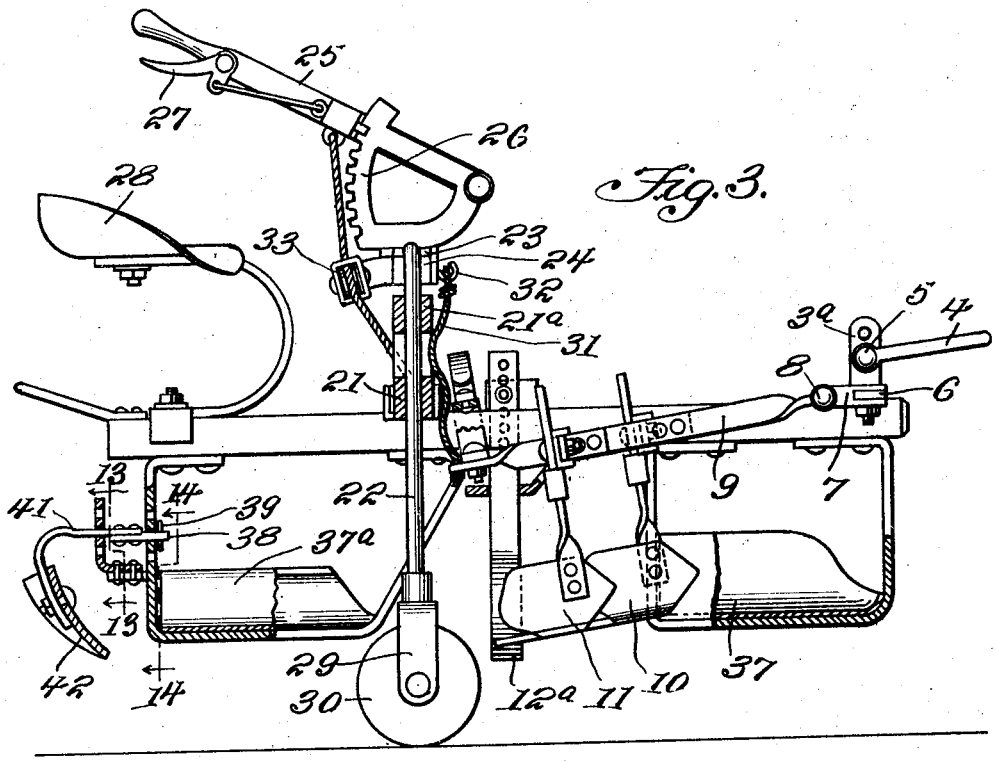

Aug. 27, 1929.  D. H. CLUBB  1,726,384
CULTIVATOR
Filed Aug. 27, 1927   3 Sheets-Sheet 3
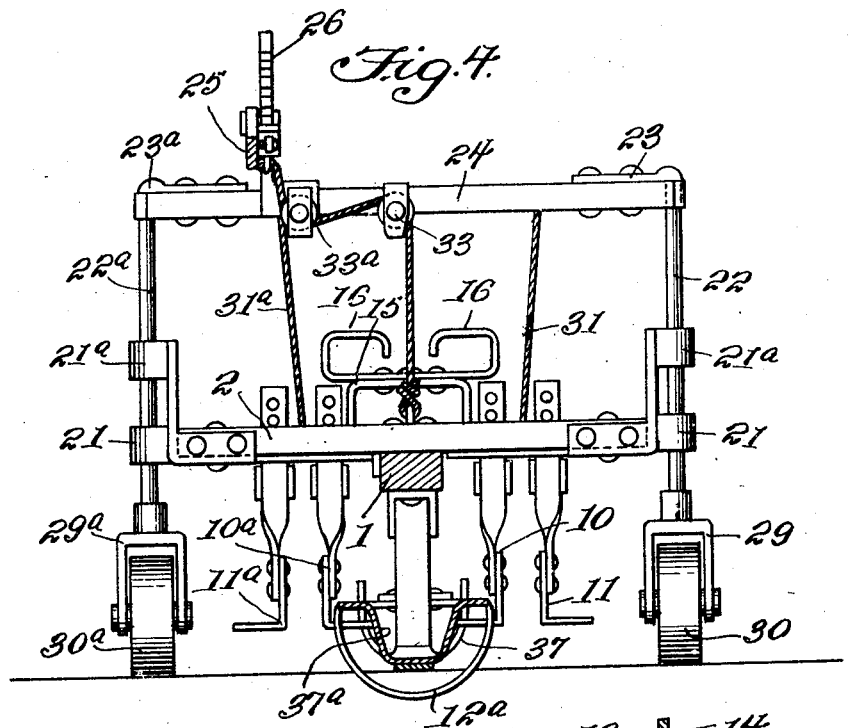
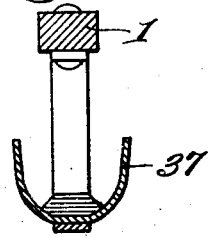
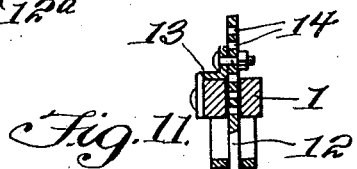
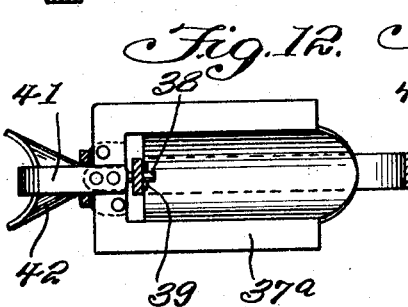
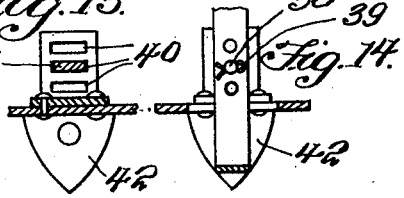
David H. Clubb
INVENTOR
BY Victor J. Evans
ATTORNEY
WITNESS: J.T.L. Wright Patented Aug. 27, 1929.

1,726,384

UNITED STATES PATENT OFFICE.

DAVID H. CLUBB, OF OLATHE, COLORADO.

CULTIVATOR.

Application filed August 27, 1927. Serial No. 215,920.

This invention relates to agricultural machines adapted to act as a combined cultivator and seeder to prepare the ground in good condition to propagate plant growth.

In carrying out the invention I provide a draught machine omitting the usual tongue, providing the tractive pull by a clevis on a median drawbar on which is mounted the operative parts of the machine. The drawbar is of comparatively short length having a seat for the driver mounted on the rear accessible to an operating lever for controlling mechanism effecting the several functions of the machine. On the drawbar about midway its length is mounted a vertically movable wheeled frame carrying a pair of transverse wheels by which the cultivating tools to prepare the soil and sow the seed are variably controlled in a manner to graduate the depth of furrow and plow a trench adjoining the same, with a framework by which the weeds may be cut on each side of the furrow and the soil progressively tamped and turned over to form ridges at the sides of the furrow, and means in advance by a forward tamping and leveling slide for leveling the soil at the top of the furrow preliminary to its compacting by the trailing slide. The invention is especially adapted to the cultivation of an onion crop. The machine by reason of its single pair of wheels is of unusually light weight and is easily controlled.

The several features of construction will be more fully hereinafter described and the novelty will be definitely indicated in the appended claims.

In the accompanying drawings illustrating the invention:

Figure 1 is a side elevation of a machine embodying my improvements.

Figure 2 is a plan thereof.

Figure 3 is a median longitudinal section.

Figure 4 is a median transverse section.

Figure 5 is a vertical section on the plane 5—5 of Figure 1.

Figure 6 is a vertical section on the plane 6—6 of Figure 1.

Figure 7 is a vertical section on the plane 7—7 of Figure 2.

Figure 8 is a vertical section on the plane 8—8 of Figure 7.

Figure 9 is a section on the plane 9—9 of Figure 7.

Figure 10 is a vertical section on the plane 10—10 of Figure 1.

Figure 11 is a vertical section on the plane 11—11 of Figure 1.

Figure 12 is a horizontal section on the plane 12—12 of Figure 1.

Figure 13 is a section on the plane 13—13 of Figure 3.

Figure 14 is an irregular section on the plane 14—14 of Figure 3.

Referring now in detail to the drawings, 1 represents a stout timber beam which carries the operating parts of the machine. About midway its length is mounted by bolts a transverse beam 2. Both the draught beam and transverse beam may be of oak or similar hard wood or of metal backing. At the front end of the drawbar 1 is pivotally mounted a metallic fork 3, $3^a$ in which is pivoted a clevis 4 mounted on a transverse bolt 5, and pivotally mounted in a vertical plane to which a trace connecting the traction machine or a horse may be connected. Extension arms 6, $6^a$ integral with the yoke 3, $3^a$ are securely bolted thereto and a pair of arms to which is bolted straps 7, $7^a$ provided with pintles 8, $8^a$ form a hinged joint with bars 9, $9^a$ which severally support vertical weed cutters and plows 10, $10^a$ lying on a horizontal incline to the direction of traction and to serve as cutters for the weeds and as plow points or shovels to turn the soil to a central furrow. I employ two pairs of these 10, $10^a$ and 11, $11^a$ both connected to the bars 9, $9^a$ by transverse rivets, as indicated. Pivotally mounted on the drawbar in the rear of the plane of the cutters and plows is a flat metal bar 12 mounted on an angular bracket 13 and provided with a plurality of transverse holes 14, by which it may be raised and lowered by means of a removable pin, which terminates at the bottom in a transverse sharp circular furrow cutter $12^a$, thereby permitting it to be adjusted vertically with reference to the furrow so as to cut the soil after being thrown up by the plows and weed cutters. In advance of the weed cutters and plows is mounted a furrow slide 37 of trough shape which diverts weeds to a plane where they will be cut by the cutter and turned over by the plows and which also acts as a leveler for the earth. There are two of these, one forward of the machine and the other at the rear, and both mounted by bolted metallic straps to the drawbar. On an arched metallic cross piece 15 bolted to the slide bars 9, 9ª is a pair of toe rests 16, 16ª for the driver's feet, by which the rectangular frame 9, 9ª, may be pressed down to hold the plows and cutters in the furrow. To accommodate horizontal adjustment the position of the cutters and plows may be shifted laterally in a plurality of holes 18 in any of which the bolts 19, 19ª may be mounted to afford such adjustment. A similar adjustment may be provided at the rear by a series of bolt holes 20, 20ª connected with the base of the arched frame 15. The cross beam 2 carries on its outer end a pair of loops or vertical cylindrical guides 21, 21ª at each side of the cross beam forming part of a bracket bolted to the cross beam and to form guides to properly align a vertically movable frame 22, 22ª mounted in brackets 23, 23ª connecting the rods 22, 22ª with a transverse beam 24, on which is mounted a support for an adjusting lever 25 pivoted on a quadrant 26 on the teeth of which may be latched a pin controlled by a thumb piece 27 which is accessible to the operator's seat 28. The adjustable vertical frame 22, 22ª carries a forked bottom 29, 29ª in which is journaled a pair of casters or wheels 30, 30ª which forms a pivotal wheeled support for the cultivator. Obviously, as the operator raises or lowers the handle the parts mounted on the drawbar are lowered with relation to the ground so as to regulate the depth of cutting of the plows and weed cutters. Flexible connections 31, 31ª connecting with the rear end of the bars 9, 9ª support the pivoted frame on a pair of hooks 32, 32ª, thus providing a limit for its downward motion of the bars. Secured to the middle of the transverse bar 2 is a rope or chain or other flexible connection which passes over a pair of pulleys 33, 33ª to a lever 25; the rope is secured in a hole in a bracket attached to a mediate point in the operating lever 25. Thus, the operator by pressing the thumb latch 27 releases the lever from the notches in the quadrant and the frame carrying the cultivating tools is lowered with respect to the ground, the rods carrying the wheels rising vertically in the guides 21, 21ª. If the lever is thrown to the full limit this will raise the trailing marker 42 which may be thus raised clear of the ground as well as the front plows, weed cutters and slides. The marker is adjustably mounted in the trailing slide 37ª in the vertical support of which are a plurality of vertically displaced holes in which a pin 38 may be inserted and locked by a cotter pin 39. A plurality of cooperating holes 40 in a standard bolted to the rear edge of the slide 37ª aligns with the horizontal rod 41 which carries the triangular blade 42 of the marker. The cotter pin permits the removal of the marker and detachment of the slide 37ª to be transposed in place of slide 37 to the front of the machine when seeding is desired. For this purpose a seeder is mounted on the machine in a position behind the marker after the soil has been cultivated by preliminary treatment thereof. A second transit over the field following the furrows formed by the previous cultivating treatment sows the seed in the furrow formed and any error of alignment of the machine with respect to the preliminarily formed furrow will score the ground by the triangular point of the blade 42 in which seed will be deposited, the following cultivator tools being adjusted in a plane to smooth and tamp the soil over the seed.

It will thus be seen that I have provided a combined cultivator and seeder requiring but little power to operate, being intended to follow a preliminary preparation of the fields in which it operates by plowing and being supported on a single pair of low wheels is directed as to its translative motion with a minimum tractive resistance, the only resistance offered being the weed cutting tools and shallow shovels or plows and the frictional resistance of the light structural slides. In operating the machine the operator from his seat will plant his feet in the straps 16, 16ª and the pressure of his feet holds the tilting tools to their work, the forward slide 37 smoothing the soil. The sharp blades of the circular cutter 12ª will slice the soil and drop it at the rear, where the trailing slide will tamp it or smooth it down and the taper point of the marker will form a furrow. In transporting the machine the lever will be thrown upward, clearing all contact of the cultivator tools with the ground, as indicated in Figure 3, and permitting the machine to be transported to the desired points of cultivation and then lowered for treatment as described.

Having thus described my invention, what I claim as new and desired to secure by Letters-Patent is:

1. A cultivator comprising a wheeled tractive machine having a pair of furrow slides to tamp and smooth the earth, said slides being mounted on a drawbar forward and aft of the wheels, a pair of adjustable weed cutters and plows at each side of a median tractive line, a trailing furrow cutter with a horizontally arched blade to cut and lay the soil, a lever accessible to an operator to vary the depth of cultivating tools in the soil, a trailing furrow slide to smooth the soil in the furrow formed by the plows, and a marker for the center of the furrow.

2. A combined cultivator and planter, comprising a tractive machine having a pair of furrow slides to tamp and smooth the earth, said slides being mounted on a drawbar forward and aft of the wheels, a pair of horizontally adjustable weed cutters and plows at each side of a median tractive line, a trailing furrow cutter with a horizontally arched blade to cut and lay the soil, a taper furrow marker and seeder following immediately after the furrow cutter, means for raising and lowering the cultivator and planting tools, and a final tamping slide to compress the furrow, the cultivator being mounted on a single pair of wheels.

3. A cultivator, having a single pair of wheels, a pivoted frame mounted for adjustment in a vertical plane, pedals adapted to hold the cultivator tools and the cultivator under control of the operator, weed cutters and plows for forming a median furrow, a furrow cutter for cutting and laying the furrow soil, and means for raising and lowering the combined set of cultivator tools by a lever controlled by the operator.

4. A cultivator, having a single pair of wheels, a pivoted frame mounted for adjustment in a vertical plane, the latter by pedal control of the operator, weed cutters and plows for forming a median furrow, a furrow cutter for cutting and laying the furrow soil, means for raising and lowering the combined set of cultivator tools, a leveling and tamping slide for the furrow, and a marker at the rear of the slide.

5. A cultivator having a single pair of wheels vertically movable at the sides of the machine, a lever for raising and lowering the movable frame in which the wheels are journaled, a manually adjustable lever accessible to the operator for raising and lowering the frame, a pivoted frame carrying cultivator tools adjustable by the operator's feet to govern the same, and a slide for tamping the soil and firming it for marking.

6. A cultivator comprising a median drawbar, a rectangular frame pivoted for vertical adjustment carrying at its sides two pairs of dependent plows and weed cutters having shares to turn the soil to a central furrow and a sharp inclined edge to sever weeds, said pairs being at different lateral positions, the arched transverse end of said frame carrying a pair of pedals for the operator's feet, and a pair of slides mounted on the drawbar in tandem at the front and rear of the drawbar and controlled by a lever accessible to the operator's hands for smoothing the plowed soil.

7. A cultivator comprising a median drawbar, a rectangular frame pivoted for vertical adjustment carrying at its sides two pairs of dependent plows and weed cutters having shares to turn the soil to a central furrow and a sharp inclined edge to sever weeds, said pairs being at different lateral positions, the arched transverse end of said frame carrying a pair of pedals for the operator's feet, a pair of slides mounted on the drawbar in tandem at the front and rear and controlled by a lever accessible to the operator's hands for smoothing the plowed soil, and a final furrow shovel to mark the furrow for planting.

In testimony whereof I affix my signature.

DAVID H. CLUBB.